(12) United States Patent
Schultz, Jr. et al.

(10) Patent No.: US 7,205,864 B2
(45) Date of Patent: Apr. 17, 2007

(54) DISTRIBUTED MATRIX SWITCH

(75) Inventors: John C. F. Schultz, Jr., Los Angeles, CA (US); Lawrence Griffin Crawford, Camarillo, CA (US)

(73) Assignee: Nextg Networks, Inc., San Jose, CA (US)

( * ) Notice: Subject to any disclaimer, the term of this patent is extended or adjusted under 35 U.S.C. 154(b) by 21 days.

(21) Appl. No.: 10/980,055

(22) Filed: Nov. 2, 2004

(65) Prior Publication Data

US 2006/0091972 A1 May 4, 2006

(51) Int. Cl.
*H01P 1/10* (2006.01)
*H01P 5/12* (2006.01)
(52) U.S. Cl. ...................... 333/104; 333/101
(58) Field of Classification Search ................ 333/101, 333/103, 104; 455/13.3, 428, 562.1; 370/411
See application file for complete search history.

(56) References Cited

U.S. PATENT DOCUMENTS 3,833,866 A     9/1974  Boutelant ................ 333/104
5,258,978 A *  11/1993  Cloonan et al. ............. 370/411
6,405,018 B1 *  6/2002  Reudink et al. .............. 455/20
6,492,882 B2 * 12/2002  Cayrou et al. .............. 333/101
6,577,879 B1 *  6/2003  Hagerman et al. ........ 455/562.1

* cited by examiner

*Primary Examiner*—Dean Takaoka
(74) *Attorney, Agent, or Firm*—Vierra Magen Marcus & DeNiro LLP

(57) ABSTRACT

The present invention relates to an electrical space switch matrix having m input ports and n output ports, the switch matrix comprising (m.n)/(i.j) switch blocks, each having i input ports and j output ports, where i is less than m and j is less than n; and a plurality of input elements and a plurality of output elements, the plurality of input elements and plurality of output elements being arranged so as to connect the switch blocks to the input and output ports of the switch matrix. In an embodiment of the invention, the input and output elements can be power splitters and power combiners respectively and are arranged so as to include crossover connection paths therebetween, with the result that crossover of connection paths is distributed between the power dividing/combining function and the switching function.

21 Claims, 6 Drawing Sheets

DISTRIBUTED MATRIX SWITCH

BACKGROUND OF THE INVENTION

The present invention relates to a space switch matrix for electrical signals, in particular but not exclusively for switching microwave or radio frequency signals.

Switching matrices for microwave or radio frequency signals are well known and have been implemented previously in a number of ways. For example U.S. Pat. No. 3,833,866 discloses an arrangement for an m×n switch matrix which comprises m (1×n) power dividers, n (1×m) power combiners and m×n switched transmission lines connecting each output arm of the dividers with each input arm of the combiners. Such an arrangement is depicted in FIG. 1 for the example case of an 8×8 switch matrix. It comprises 1:8 power dividers 1 on each of the 8 input ports, 8:1 power combiners 2 on each of the 8 output ports and 64 interconnecting transmission lines 3 each containing a terminated on-off switch 4.

This type of switch matrix allows any input port to be connected to any output port. It also allows any combination of input ports to be connected to any combination of output ports and so can be used in a number of modes including broadcast. U.S. Pat. No. 3,833,866 discloses an arrangement where a large switch matrix is constructed using a set of interconnected circuit boards. For example an 8×8 switch matrix would be constructed using 8 input circuit boards containing power dividers and 8 perpendicularly mounted output circuit boards containing power combiners, at least one of the boards also containing on-off switches. However, this approach is difficult to implement with acceptable size, cost and performance.

The present invention discloses a means of reducing the size and insertion loss while at the same time increasing the isolation and return loss of a microwave switch matrix for a given bandwidth compared to prior art designs.

BRIEF SUMMARY OF THE INVENTION

According to a first aspect of the present invention, there is provided an electrical space switch matrix having m input port and n output ports on a single, multi-layer PCB. Such an arrangement provides reductions in size and cost.

According to a second aspect of the present invention, there is provided an electrical space switch matrix having m input ports and n output ports, the switch matrix comprising (m.n)/(i.j) switch blocks, each having i input ports and j output ports, where i is less than m and j is less than n; and a plurality of input elements and a plurality of output elements, said plurality of input elements and plurality of output elements being arranged so as to connect the switch blocks to the input and output ports of the switch matrix.

In embodiments of the invention, input elements can be embodied as power splitters and output elements can be embodied as power combiners, the power splitters and plurality of power combiners being arranged so as to include crossover connection paths therebetween. As a result, crossover of connection paths is distributed between the power dividing/combining function and the switching function. Advantages of embodiments of the invention include a reduced physical size and a reduction in the number of circuit board layers (and therefore lower cost of manufacture) compared to a single large matrix, because the switch blocks can be incorporated within the crossover network of interconnection paths. This approach also leads to a reduction in the length of the interconnection paths, which gives reduced insertion loss. Furthermore, the switch block, and correspondingly the distributed matrix, can be designed with improved isolation and return loss performance for a given bandwidth compared to the single large matrix.

According to a third aspect of the invention there is provided an electrical space switch matrix comprising a plurality of input elements and a plurality of output elements, said input elements being arranged as a first input layer and a second input layer, each input layer comprising a plurality of input elements, individual elements of the first input layer being connected to two, different, elements of the second input layer, and each element of the second input layer being connected to one element of the first input layer, said output elements being arranged as corresponding first output layer and second output layer, each output layer comprising a plurality of output elements, individual elements of the first output layer being connected to two, different, elements of the second output layer, and each element of the second output layer being connected to one element of the first output layer, wherein the connections between said first and second input layers has a first inter-element connection pattern and the connections between corresponding first and second output layers has a second, different inter-element connection pattern.

In one arrangement the input elements of the second input layer are connectable to output elements of the second output layer by means of connection paths. At least some said connection paths include a switch device and at least some said connection paths include crossovers. Preferably said input elements comprise power splitter devices and said output elements comprise power combiner devices. In one arrangement there can be an equal number of input elements and output elements (so-called square matrix), while in other arrangements there can be a different number of input elements and output elements; in either configuration the connection pattern between respective layers is different. It will be appreciated that this aspect of the invention also includes arrangements whereby the number of input layers is different to the number of output layers, notwithstanding the matrix comprising a minimum of two of each type of layer. Advantageously the electrical space switch matrix is arranged to operate within the microwave or radio frequency range.

According to a fourth aspect of the present invention there is provided an electrical space switch matrix comprising a plurality of input elements and a plurality of output elements, the input and output elements being connected by a set of switches, said input elements being arranged as a first input layer and a second input layer, each input layer comprising a plurality of input elements, individual elements of the first input layer being connected to two, different, elements of the second input layer, and each element of the second input layer being connected to one element of the first input layer, said output elements being arranged as corresponding first output layer and second output layer, each output layer comprising a plurality of output elements, individual elements of the first output layer being connected to two, different, elements of the second output layer, and each element of the second output layer being connected to one element of the first output layer, wherein the connections between the input and output elements include crossovers, and wherein the connections between elements in the first and second input layers, and/or the connections between elements in the first and second output layers, also include crossovers.

According to a fifth aspect of the present invention there is provided an electrical space switch block for use in an electrical space switch matrix, the electrical space switch matrix comprising a plurality of input elements and a plurality of output elements, said input elements being arranged as a first input layer and a second input layer, each input layer comprising a plurality of input elements, individual elements of the first input layer being connected to two, different, elements of the second input layer, and each element of the second input layer being connected to one element of the first input layer, said output elements being arranged as corresponding first output layer and second output layer, each output layer comprising a plurality of output elements, individual elements of the first output layer being connected to two, different, elements of the second output layer, and each element of the second output layer being connected to one element of the first output layer, said switch block comprising: a plurality of switches and connection paths between said input elements of the second input layer and output elements of the second output layer, said connection paths being arranged so as to form a crossover with one another.

Embodiments of the invention can be used to switch radio frequency (RF) signals and microwave signals, intermediate frequency (IF) signals or electrical signals such as high speed digital streams. Possible applications for embodiments of the invention include the switching and distribution of satellite signals, which could be from studio to broadcast equipment or within an apartment block or office block, the switching of cellular radio or other wireless signals for either in-building or outdoor applications, antenna beam-forming applications and frequency band monitoring applications.

These and other features and advantages of embodiments of the present invention will be apparent to those skilled in the art from the following detailed description of the embodiments of the invention, when read with the drawings and the appended claims.

DETAILED DESCRIPTION OF THE INVENTION

In the following description of embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

As already noted, the prior art approach to electrical space switch matrix construction is difficult to implement with acceptable size, cost and performance.

Figure 1:
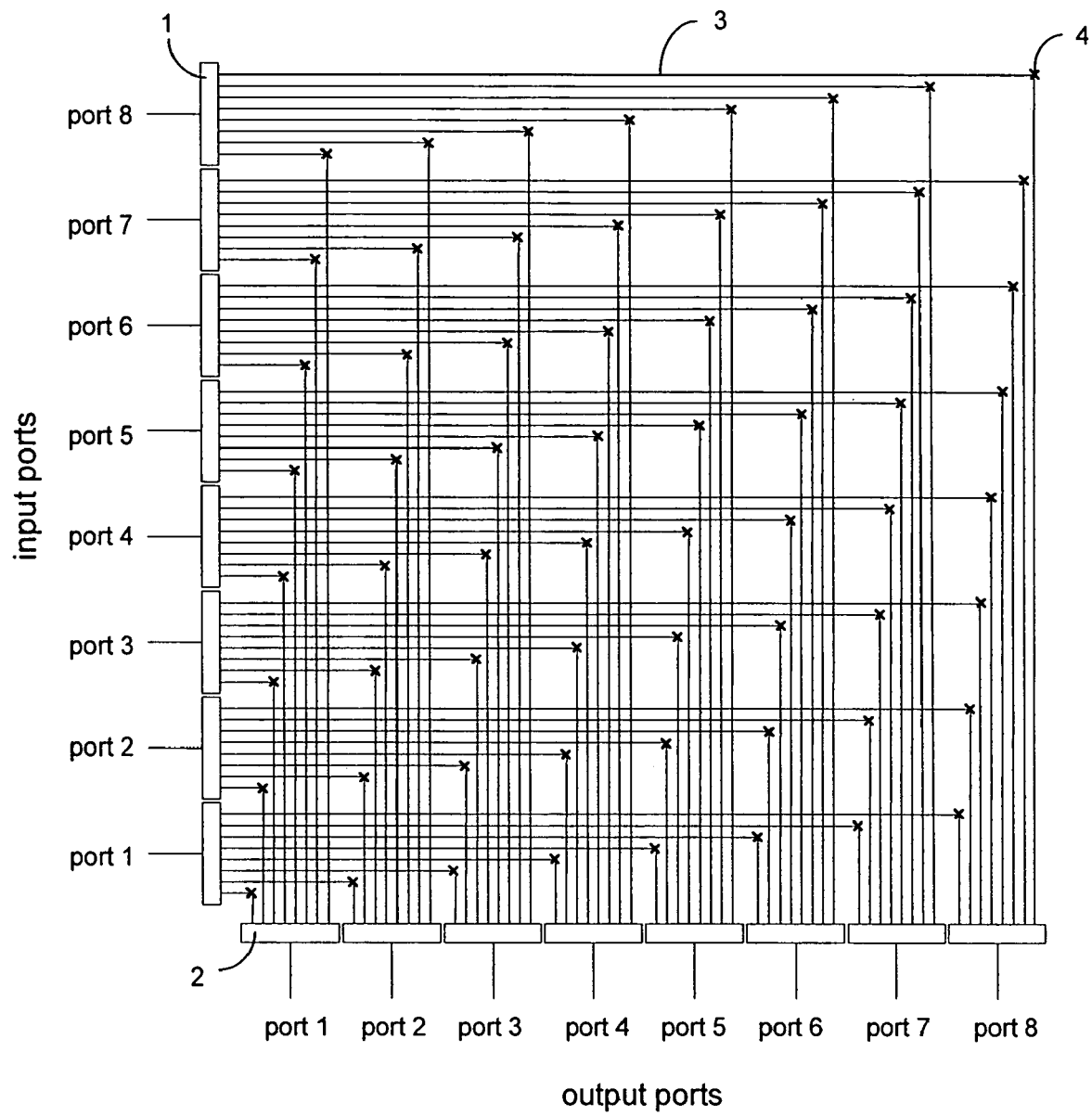
FIG. 1 is a schematic diagram showing an example of a known electrical space switch matrix arrangement.
Figure 2:
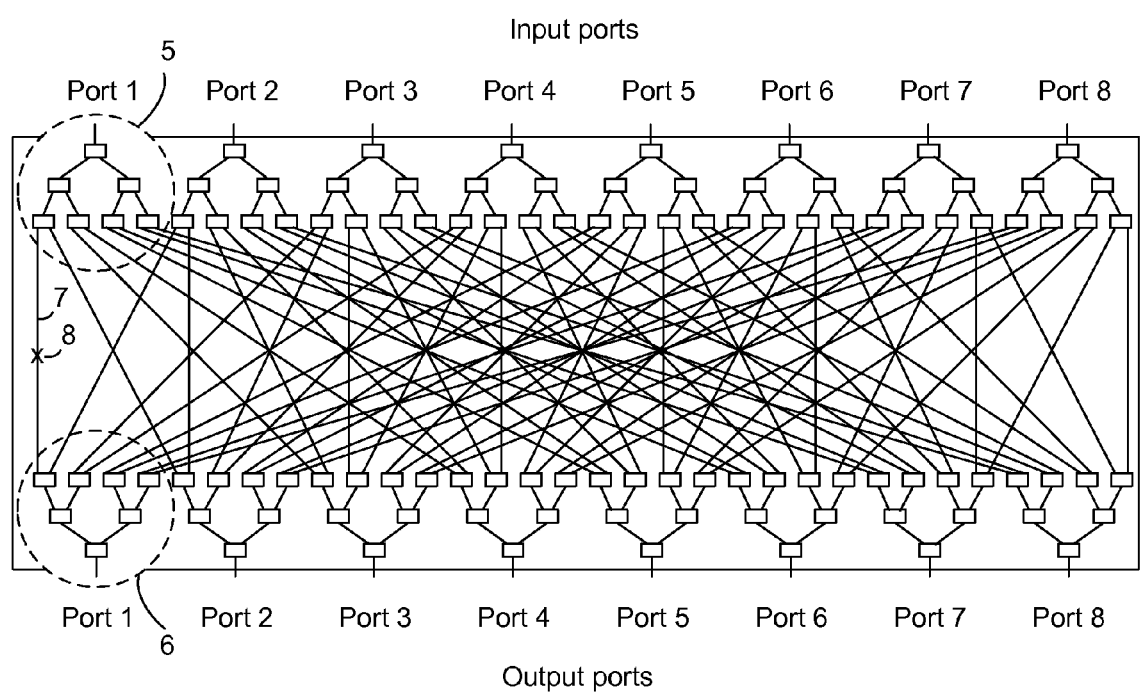
FIG. 2 is a schematic diagram showing a first embodiment of a switching arrangement implemented in a single, multi-layer PCB.

FIG. 2 shows a switch matrix implemented as a single, multi-layer PCB rather than with multiple interconnected PCBs as is the case for the switch matrix of FIG. 1. The switch matrix comprises 1:8 power dividers 5 and 8:1 power combiners 6, each of which has been deconstructed into basic 1:2 or 2:1 building blocks in this figure, and are grouped within the dashed circles only for input and output port 1 to aid clarity. The 1:8 power dividers and the 8:1 power combiners are interconnected by 64 crossover transmission lines 7, each containing one or more switch elements 8. Only one of these switch elements is drawn on the figure for reasons of clarity.

The use of a single, multi-layer PCB has many advantages including reduced size and cost. Although the embodiment uses a matrix size of 8×8 by way of example, it should be noted that the present invention is not restricted to any particular matrix size. Furthermore, the matrix need not have equal numbers of input ports and output ports nor identical connection patterns, e.g., 2 1:2 dividers and 2 2:1 combiners for each input port and output port, respectively.

An important aspect of this design is that each of the 64 crossover transmission lines must have the same path length, in order to ensure that electrical performance does not depend on the signal routing. For example, the same insertion loss must be maintained for a signal travelling between input port 1 and output port 1 as is incurred by a signal travelling between input port 1 and output port 8. To achieve this, additional lengths of transmission line must be inserted into all but the longest path so that all paths become the length of the longest path. Furthermore, this must be engineered without an excessive number of PCB layers whilst maintaining acceptable isolation, return loss and insertion loss performance.

It is important at this stage to make a distinction between a switch matrix and a switch block. In this context, a switch block is defined as having i inputs and j outputs (where i<m and j<n) and consists of i 1:j power dividers, j i:1 power combiners, and (i×j) switched transmission lines interconnecting the output arms of the power dividers with the input arms of the power combiners. The switch block is a constituent part of the switch matrix, and for the case shown in FIG. 2, it constitutes the whole of the switch matrix as denoted by the shaded area.

The present invention comes from the realization that there are significant advantages to constructing a switch matrix by using a number of smaller-sized switch blocks. Each of these switch blocks is connected to the input and output ports of the switch matrix using power dividers and power combiners. This has the effect of distributing the crossover functionality within the power dividing/combining functionality, which gives a number of benefits as will be set out later.

Figure 3:
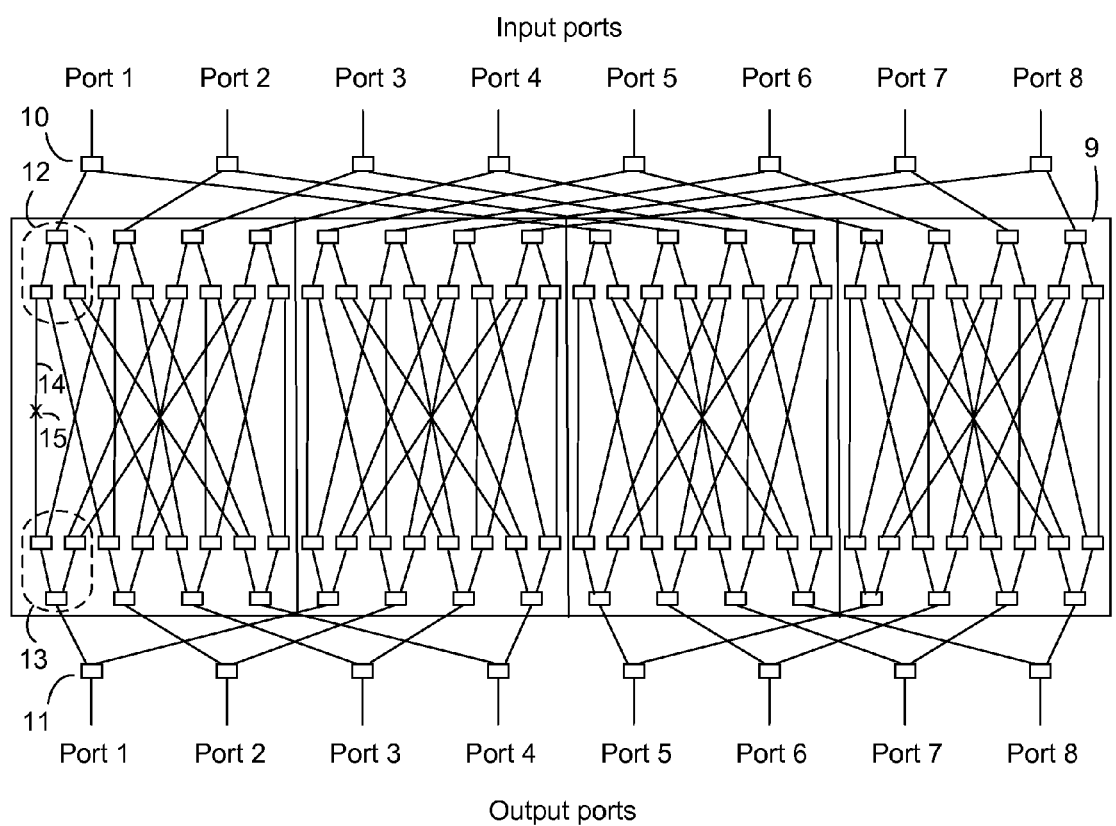
FIG. 3 is a schematic diagram showing a second embodiment of an electrical space switch matrix arrangement according to the present invention.

FIG. 3 shows one embodiment of a switch matrix in accordance with the present invention with example size of 8×8, made using switch blocks 9 of size 4×4. These switch blocks are shown shaded in the figure. The switch matrix is formed from a single multi-layer PCB and comprises 8 1:2 power dividers 10 on the 8 input ports, 8 2:1 power combiners 11 on the 8 output ports and 4 4×4 switch blocks. Each 4×4 switch block comprises 4 1:4 power dividers 12, 4 4:1 power combiners 13, and 16 switched crossover transmission lines 14, linking the power dividers with the power combiners (only one switch 15 is shown in this figure for reasons of clarity). One can calculate the number of switch blocks by using the following equation:

$$(m.n)/(i.j) \quad \text{(Equation 1)}$$

Applying Equation 1 to FIG. 3, m and n are both 8. Their product is 64. Each switch block has four input ports and four output ports, making both i and j have a value of 4. Their product is 16. The first product (64) divided by the second product (16) leads to 4 which is the number of switch blocks illustrated in FIG. 3.

Figure 4:
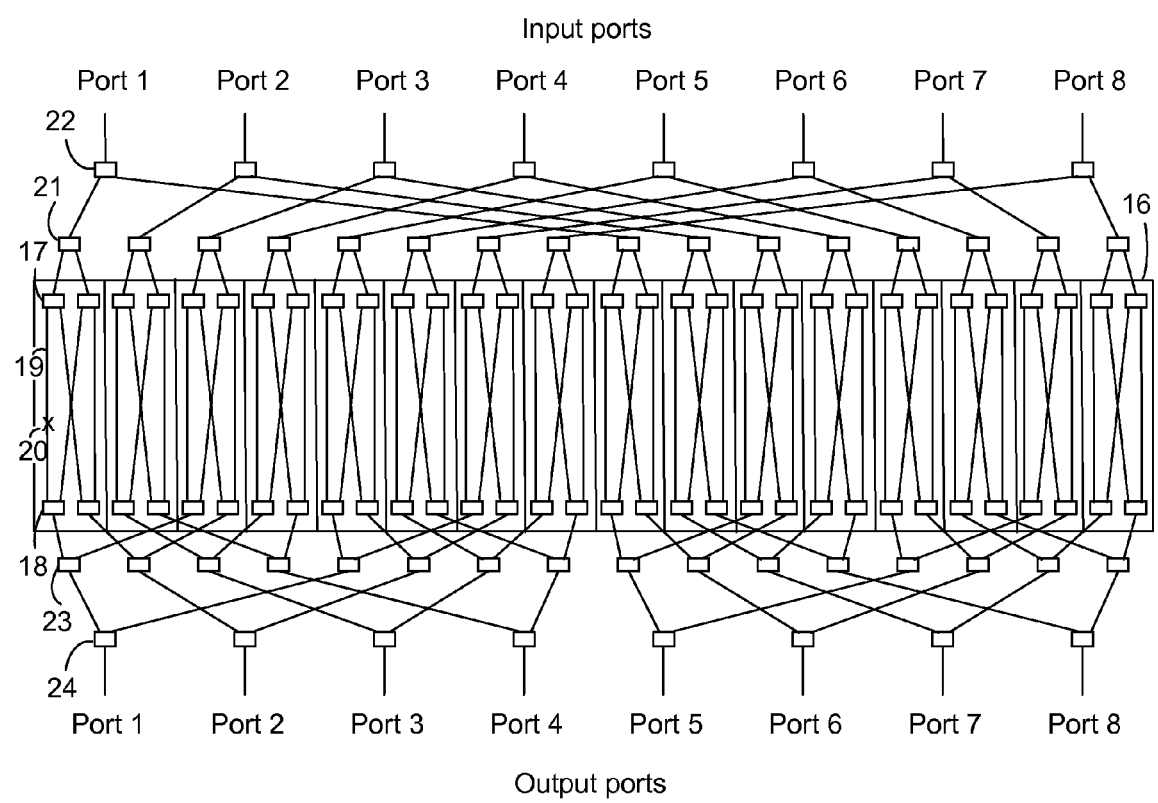
FIG. 4 is a schematic diagram showing a third embodiment of an electrical space switch matrix arrangement according to the present invention.

FIG. 4 shows another embodiment of a switch matrix in accordance with the present invention, again with example size of 8×8, and again formed using a single, multi-layer PCB. Here, there are 16 switch blocks of size 2×2 16 and again are shown shaded in the figure. The number of switch blocks can be calculated using Equation 1 in the manner discussed above. Each switch block comprises 2 1:2 power dividers 17, 2 2:1 power combiners 18, and 4 switched crossover transmission lines 19. Only one switch 20 is drawn on this figure for reasons of clarity. The switch blocks are connected to the input and output ports of the switch matrix via a two-stage hierarchy of 1:2 power dividers 21, 22 and 2:1 power combiners 23, 24.

Although the embodiments described above use a matrix size of 8×8 by way of example, it should be noted that the present invention is not restricted to any particular matrix size, and furthermore, the matrix need not have equal numbers of input ports and output ports.

An important aspect of the present invention lies in the distribution of crossover connection paths between the power dividing/combining function and the switching function. The distribution of the crossover within the power dividing/combining function leads to a number of significant advantages.

The first advantage is that the depth of crossovers in the interconnecting switched transmission lines is greatly decreased, which means that far fewer layers of PCB are required to implement a given size of switch matrix. This is due to the fact that the crossovers can be distributed over the plane of the PCB and, thus, crossovers can share fewer layers. The overall effect is reduced implementation cost.

Figure 5:
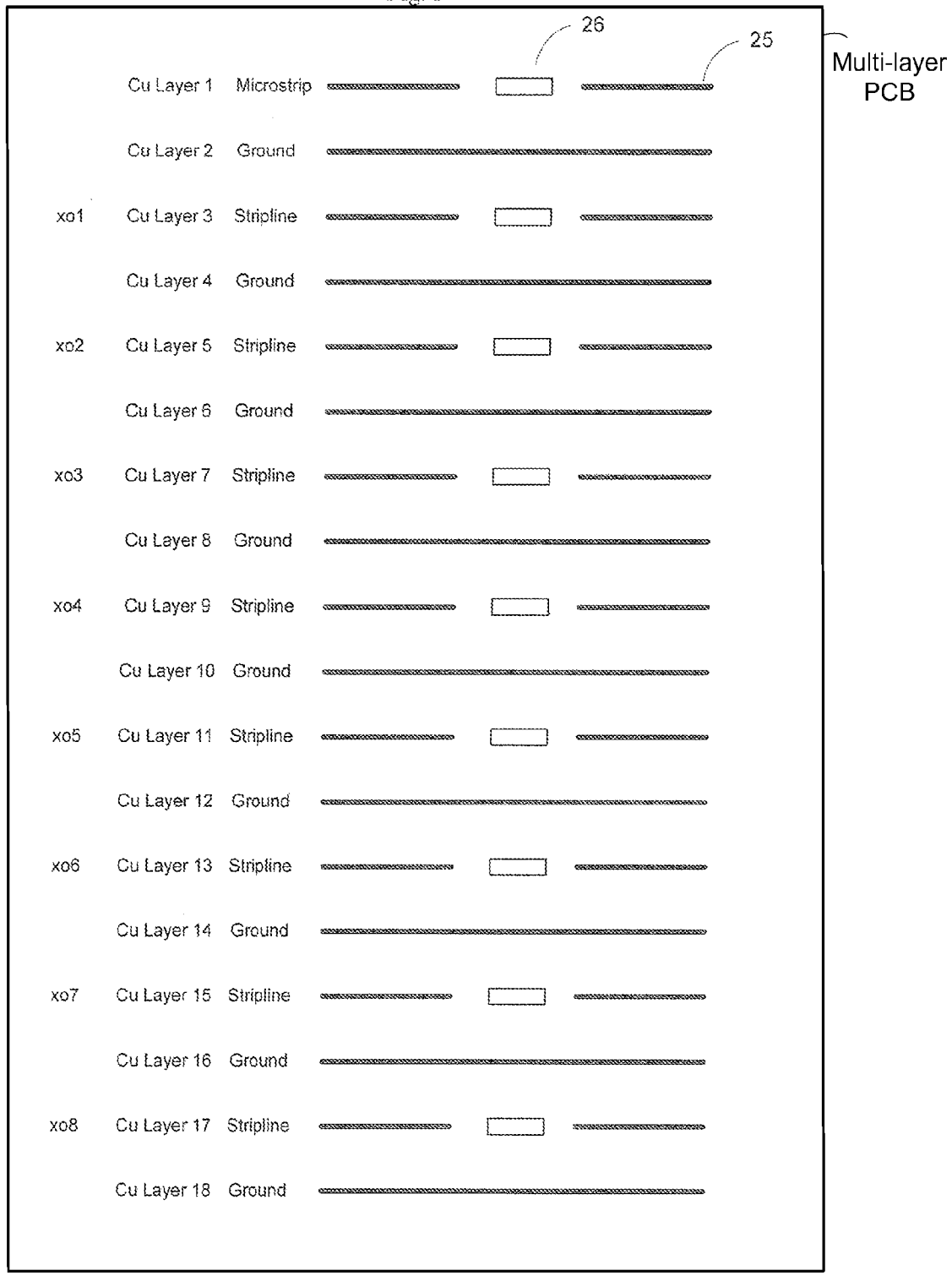
FIG. 5 is a schematic diagram showing a printed circuit board layer implementation of the switch matrix arrangement shown in FIG. 2

FIG. 5 shows the layer stack required for an 8×8 switch matrix using a single 8×8 switch block (i.e., corresponding to the switch matrix shown in FIG. 2). The crossovers are denoted by xo1, xo2, etc. The copper (Cu) layers are denoted by the thick lines 25, and etched copper lines are denoted by the rectangles 26.

In PCB terminology, an etched copper line sandwiched between two copper ground layers is a "stripline" and an etched copper line with a single ground layer is a "microstrip." Connections between lines from different layers are made using vias, which are copper-plated holes between layers with controlled impedance (to minimize reflected power). The number of striplines are dictated by the smallest unit power divider or combiner. In the case of FIG. 5, the smallest unit power divider or combiner is 8. Thus, the number of striplines is 8 and including the microstrip and ground lines, the total is 18 copper layers.

Figure 6:
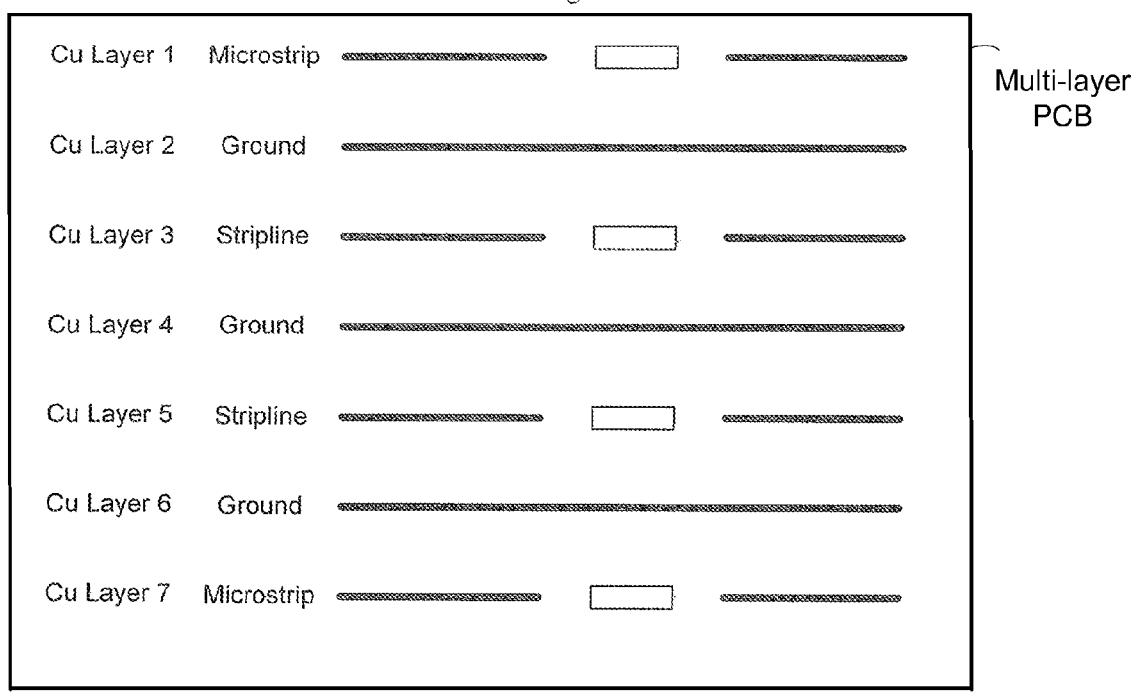
FIG. 6 is a schematic diagram showing a printed circuit board layer implementation of a switch matrix arrangement shown in FIG. 4.

By contrast, FIG. 6 shows the layer stack required for an 8×8 switch matrix according to the present invention using 16 2×2 switch blocks. In this case, the smallest unit power divider or combiner is 2. Thus, the number of striplines is 4 and including the microstrip and ground lines, only 6 layers are required (an additional microstrip is added in FIG. 6).

The second advantage is that the interconnecting switched transmission lines are shorter, which leads to reduced insertion loss and smaller implementation size. This is especially significant as a result of the path length balancing requirement mentioned previously.

The third advantage is that offset phase cancellation techniques can be used effectively because the switched transmission lines are short. This results in improved return loss and isolation performance of the switch matrix. Offset phase cancellation is a technique whereby the output arms of a coupler (power divider or power combiner) have unequal lengths and where the length difference is around a quarter of a wavelength. The reflected power from each of the output arms therefore arrives back at the coupler input with 180° phase offset, which results in cancellation of reflected power. This gives high return loss and high isolation. This technique is much more effective in circuits where the coupler output arms are relatively short. Long interconnecting transmission lines give rise to many phase rotations in the transmitted signal which would make precise and controllable phase cancellation very difficult to achieve. This technique is particularly relevant to the Wilkinson coupler, which is the preferred coupler type for this application due to its simple design and compact geometry.

The fourth advantage is that the small switch blocks provide the opportunity for a modular design; one relatively simple but precise design can be repeated to build up a much more complex system. This leads to reduced design time, which correspondingly leads to reduced implementation cost.

The net effect of these advantages is a switch matrix design that has high return loss, high isolation between ports, low insertion loss, small physical size and a low number of circuit board layers. It therefore allows a switch matrix to be constructed with a combination of high electrical performance and low implementation cost compared to prior art approaches.

Although the present invention has been fully described in connection with the embodiments thereof and with reference to the accompanying drawings, it is to be noted that various changes and modifications will become apparent to those skilled in the art. Such changes and modifications are to be understood as being included within the scope of the present invention as defined by the claims.

What is claimed is:

1. A switch matrix having m input ports and n output ports, the switch matrix comprising:
   a number (m×n)/(i×j) of switch blocks which interconnect the m input ports with the n output ports, each of the switch blocks having i input ports and j output ports, where i is less than m and j is less than n; and
   a plurality of input elements comprising power splitter devices and a plurality of output elements comprising power combiner devices, said plurality of input elements and plurality of output elements being arranged so as to connect the switch blocks to the input and output ports of the switch matrix.

2. The switch matrix according to claim 1, wherein each of the switch blocks has two input ports and two output ports.

3. The switch matrix according to claim 1, wherein:
   the plurality of input elements are arranged in a hierarchy of stages; and
   the plurality of output elements are arranged in a hierarchy of stages.

4. A switch matrix comprising:
   a plurality of input elements and a plurality of output elements, the input and output elements being connected by a set of switches, said input elements being arranged in first and second input layers of a multi-layer printed circuit board, each input layer comprising a plurality of input elements, each input element of the first input layer being connected to two, different input elements of the second input layer, and each input element of the second input layer being connected to one input element of the first input layer, said output elements being arranged in corresponding first and second output layers of the multi-layer printed circuit board, each output layer comprising a plurality of output elements, each output element of the first output layer being connected to two, different output elements of the second output layer, and each output element of the second output layer being connected to one output element of the first output layer, wherein the connections between the input and output elements include crossovers, and wherein the connections between elements in the first and second input layers, and/or the connections between elements in the first and second output layers, also include crossovers.

5. The switch matrix according to claim 4, wherein said switch matrix is arranged to operate in the microwave or radio frequency range.

6. A switch matrix comprising:
a plurality of input elements and a plurality of output elements,
said input elements being arranged in first and second input layers of a multi-layer printed circuit board, each input layer comprising a plurality of input elements, each input element of the first input layer being connected to two, different, input elements of the second input layer, and each input element of the second input layer being connected to one input element of the first input layer,
said output elements being arranged in corresponding first and second output layers of the multi-layer printed circuit board, each output layer comprising a plurality of output elements, each output element of the first output layer being connected to two, different output elements of the second output layer, and each output element of the second output layer being connected to one output element of the first output layer, and
wherein the connections between said first and second input layers have a first inter-element connection pattern and the connections between corresponding first and second output layers have a second, different inter-element connection pattern.

7. The switch matrix according to claim 6, wherein the input elements of the second input layer are connectable to output elements of the second output layer by connection paths.

8. The switch matrix according to claim 7, wherein at least some of said connection paths include a switch device.

9. The switch matrix according to claim 7, wherein at least some of said connection paths include crossovers.

10. The switch matrix according to claim 6, further comprising:
a plurality of switch blocks, each of the switch blocks comprising a plurality of input elements and a plurality of output elements, each input element of the second input layer being connected to one input element in each of at least two of the switch blocks, and each output element of the second output layer being connected to one output element in each of at least two of the switch blocks.

11. The switch matrix according to claim 6, wherein said input elements comprise power splitter devices and said output elements comprise power combiner devices.

12. The switch matrix according to claim 6, wherein there is an equal number of input elements and output elements.

13. The switch matrix according to claim 6, wherein said switch matrix is arranged to operate in the microwave or radio frequency range.

14. The switch matrix according to claim 6, further comprising:
at least one switch block, the input elements of the second input layer connecting the input elements of the first input layer to the at least one switch block, and the output elements of the second output layer connecting the output elements of the first output layer to the at least one switch block.

15. A switch matrix having m input ports and n output ports, the switch matrix comprising:
a number $(m \times n)/(i \times j)$ of switch blocks which interconnect the m input ports with the n output ports, each of the switch blocks having i input ports and j output ports, where i is less than m and j is less than n; and
a plurality of input elements and a plurality of output elements, said plurality of input elements and plurality of output elements being arranged so as to connect the switch blocks to the input and output ports of the switch matrix, said switch matrix is arranged to operate in the microwave or radio frequency range.

16. A switch matrix, comprising:
a plurality of input elements and a plurality of output elements, said input elements being arranged in first and second input layers of a multi-layer printed circuit board, each input layer comprising a plurality of input elements, each input element of the first input layer being connected to two, different input elements of the second input layer, and each input element of the second input layer being connected to one input element of the first input layer, said output elements being arranged in corresponding first and second output layers of the multi-layer printed circuit board, each output layer comprising a plurality of output elements, each output element of the first output layer being connected to two, different output elements of the second output layer, and each output element of the second output layer being connected to one output element of the first output layer; and
a switch block which comprises a plurality of switches and connection paths between said input elements of the second input layer and said output elements of the second output layer, said connection paths being arranged so as to form crossovers.

17. The switch matrix according to claim 16, wherein said switch block is arranged to operate in the microwave or radio frequency range.

18. A switch matrix having m input ports and n output ports, the switch matrix comprising:
a number $(m \times n)/(i \times j)$ of switch blocks which interconnect the m input ports with the n output ports, each of the switch blocks having i input ports and j output ports, where i is less than m and j is less than n, and each of the switch blocks has a number $i \times j$ of switched transmission lines; and
a plurality of input elements and a plurality of output elements, said plurality of input elements and plurality of output elements being arranged so as to connect the switch blocks to the input and output ports of the switch matrix.

19. A switch matrix having m input ports and n output ports, the switch matrix comprising:
a number (m×n)/(i×j) of switch blocks which interconnect the m input ports with the n output ports, each of the switch blocks having i input ports and j output ports, where i is less than m and j is less than n, and each of the switch blocks has a number i of 1:i power dividers with output arms and a number j of i:1 power combiners with input arms; and a plurality of input elements and a plurality of output elements, said plurality of input elements and plurality of output elements being arranged so as to connect the switch blocks to the input and output ports of the switch matrix.

20. The switch matrix according to claim 19, wherein:
each of the switch blocks has a number i×j of switched transmission lines which interconnect the output arms of the power dividers with the input arms of the power combiners.

21. The switch matrix according to claim 19, wherein:
the plurality of input elements comprise power dividers which are connected to the power dividers of the switch blocks, and the plurality of output elements comprise power combiners which are connected to the power combiners of the switch blocks.

* * * * *